United States Patent
Koenen et al.

(10) Patent No.: US 10,697,417 B2
(45) Date of Patent: Jun. 30, 2020

(54) BATTERY CONNECTIONS FOR BATTERY START OF INTERNAL COMBUSTION ENGINES

(71) Applicant: Briggs & Stratton Corporation, Wauwatosa, WI (US)

(72) Inventors: Robert J. Koenen, Pewaukee, WI (US); Jason A. Hansen, Elkhorn, WI (US); Andrew Paskov, Brookfield, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 90 days.

(21) Appl. No.: 16/152,671

(22) Filed: Oct. 5, 2018

(65) Prior Publication Data
US 2019/0107096 A1    Apr. 11, 2019

Related U.S. Application Data

(60) Provisional application No. 62/568,853, filed on Oct. 6, 2017.

(51) Int. Cl.
*F02N 11/08* (2006.01)
*H01M 10/42* (2006.01)
(Continued)

(52) U.S. Cl.
CPC ........ *F02N 11/0862* (2013.01); *F02N 11/087* (2013.01); *F02N 11/0866* (2013.01); *F02N 11/14* (2013.01); *H01M 2/1077* (2013.01); *H01M 10/425* (2013.01); *F02N 11/00* (2013.01); *F02N 11/0803* (2013.01); *H01M 2220/20* (2013.01)

(58) Field of Classification Search
CPC ................. F02N 11/0862; F02N 11/14; F02N 2011/0874
See application file for complete search history.

(56) References Cited

U.S. PATENT DOCUMENTS 8,733,072 B2 *   5/2014  Hansen ................... F02N 11/08
                                                        56/10.8
8,857,138 B2 *  10/2014  Hansen ............... F02N 11/0803
                                                        56/10.8
(Continued)

*Primary Examiner* — Kevin R Steckbauer
(74) *Attorney, Agent, or Firm* — Foley & Lardner LLP

(57) ABSTRACT

A battery pack for use in providing starting power for a starter motor of an internal combustion engine and to supply power to one or more auxiliary loads. The battery pack includes an outer housing that encloses a plurality of battery cells. A control unit is positioned within the outer housing and is connected to at least a starter switching element and an auxiliary switching element. The control unit controls the position of both the starter switching element and the auxiliary switching element to selectively connect the battery cells to the starter motor and the auxiliary loads. The battery pack further includes an ignition input terminal that is connected to the ignition circuit of the internal combustion engine such that the control unit can monitor the operational status of the internal combustion engine. The control unit can selectively ground the ignition coil of the ignition circuit to enable and/or terminate operation of the internal combustion engine.

11 Claims, 10 Drawing Sheets

(51) Int. Cl.
*H01M 2/10* (2006.01)
*F02N 11/14* (2006.01)
*F02N 11/00* (2006.01)

(56) References Cited

U.S. PATENT DOCUMENTS

| | | | |
|---|---|---|---|
| 9,127,658 B2* | 9/2015 | Koenen | F04B 17/05 |
| 9,220,192 B2* | 12/2015 | Hansen | F02N 11/101 |
| 9,228,556 B2* | 1/2016 | Koenen | F04B 17/05 |
| 9,404,465 B2* | 8/2016 | Koenen | F02N 11/08 |
| 9,488,149 B2 | 11/2016 | Koenen et al. | |
| 9,624,890 B2 | 4/2017 | Koenen et al. | |
| 9,624,891 B2* | 4/2017 | Koenen | F02N 11/0803 |
| 9,644,595 B2* | 5/2017 | Koenen | F02N 11/08 |
| 9,726,135 B2* | 8/2017 | Zeiler | F02N 11/0862 |
| 9,828,966 B2* | 11/2017 | Hansen | F02N 15/003 |
| 9,890,755 B2* | 2/2018 | Koenen | A01D 34/008 |
| 9,915,238 B2* | 3/2018 | Zeiler | H02J 7/0063 |
| 9,917,460 B2* | 3/2018 | Koenen | H02J 7/0024 |
| 10,024,292 B2* | 7/2018 | Koenen | A01D 34/001 |
| 10,063,072 B2* | 8/2018 | Tanaka | H01M 4/587 |
| 10,233,889 B2* | 3/2019 | Zeiler | F02N 11/0862 |
| 10,400,732 B2* | 9/2019 | Harvey | F02N 11/0862 |
| 10,514,013 B2* | 12/2019 | Koenen | B60T 7/042 |
| 2005/0007068 A1* | 1/2005 | Johnson | H01M 10/4207 320/110 |
| 2013/0111864 A1* | 5/2013 | Hansen | F02N 11/12 56/10.8 |
| 2013/0111865 A1* | 5/2013 | Hansen | F02N 11/0803 56/11.3 |
| 2013/0343906 A1* | 12/2013 | Funke | F02N 11/0803 417/10 |
| 2014/0230393 A1* | 8/2014 | Hansen | H01M 10/02 56/10.5 |
| 2014/0299089 A1* | 10/2014 | Koenen | F04B 17/05 123/179.28 |
| 2015/0240773 A1* | 8/2015 | Koenen | F02N 11/0803 290/38 R |
| 2015/0240774 A1* | 8/2015 | Zeiler | F02N 11/0862 37/259 |
| 2015/0345459 A1* | 12/2015 | Koenen | F04B 17/05 123/179.28 |
| 2016/0108881 A1* | 4/2016 | Hansen | H01M 10/0525 123/179.26 |
| 2016/0115933 A1* | 4/2016 | Koenen | A01D 34/001 290/38 R |
| 2016/0201634 A1* | 7/2016 | Kim | F02N 11/0862 320/136 |
| 2016/0233694 A1* | 8/2016 | Koenen | H02J 7/0042 |
| 2016/0254687 A1* | 9/2016 | Tanaka | B60L 50/51 320/112 |
| 2016/0312755 A1* | 10/2016 | Koenen | A01D 34/78 |
| 2017/0298892 A1* | 10/2017 | Koenen | H01M 2/1072 |
| 2018/0119664 A1* | 5/2018 | Koenen | F02N 11/101 |
| 2018/0202407 A1* | 7/2018 | Harvey | H05K 1/181 |
| 2018/0298868 A1* | 10/2018 | Koenen | H01M 2/1072 |
| 2018/0351383 A1* | 12/2018 | Zeiler | B60L 1/003 |
| 2019/0020006 A1* | 1/2019 | Motohashi | H01M 2/1077 |
| 2019/0160972 A1* | 5/2019 | Zeiler | H01M 10/44 |
| 2019/0178219 A1* | 6/2019 | Koenen | F02D 31/002 |

* cited by examiner

HIGH SIDE SWITCHING

LOW SIDE SWITCHING

BATTERY CONNECTIONS FOR BATTERY START OF INTERNAL COMBUSTION ENGINES

CROSS REFERENCE TO RELATED APPLICATION

The present application is based on and claims priority to U.S. Provisional Patent Application Ser. No. 62/568,853, filed Oct. 6, 2017, the disclosure of which is incorporated herein by reference.

BACKGROUND

The present disclosure relates to a lithium ion battery pack having battery terminals designed for use in a starting circuit for an internal combustion engine of outdoor power equipment, such as a lawn tractor. More specifically, the present disclosure relates to a battery pack that includes specifically designed terminals and an internal control unit to direct power from the battery pack to systems of the outdoor power equipment both before and after starting of the internal combustion engine.

Presently, many different types of outdoor power equipment include electronic starting circuits that allow the user to start the internal combustion engine of the outdoor power equipment through either a key switch or a push button. Most of these starting systems include a lead acid battery that provides the voltage and current required for activating the starting system of the outdoor power equipment. In many cases, the lead acid battery is a 12-volt battery that is recharged during operation of the outdoor power equipment.

Although lead acid batteries have been used for a very long time and are relatively inexpensive, if the voltage stored by the lead acid battery is completely depleted, the lead acid battery may become ineffective at storing a charge and would thus need to be replaced. Since many pieces of outdoor power equipment can sit idle for extended periods of time, if the lead acid battery is not removed and kept charged, the lead acid battery can become completely discharged and thus must be replaced. In cases of newly purchased equipment, this replacement may fall under the manufacturer's warranty and would need to be replaced by the manufacturer.

SUMMARY

The present disclosure relates to a starter battery pack for use with a piece of outdoor power equipment, such as but not limited to a lawn tractor. More specifically, the starter battery pack includes an outer housing that encloses a plurality of individual battery cells. The starter battery pack includes a series of terminals that can be connected to components within the equipment or device powered by the battery pack.

In one embodiment, the battery pack includes a starter switching element that is positioned within the outer housing between a starter terminal and the battery pack. The starter terminal, in turn, is connected to a starter motor for the internal combustion engine. The control unit of the battery pack controls the condition of the starter switching element to power the starter motor as desired.

The battery pack further includes an auxiliary switching element that is positioned within the outer housing between an auxiliary terminal and the battery cells. The control unit can control the condition of the auxiliary element to selectively connect the battery cells to one or more auxiliary loads.

The battery pack further includes an ignition input terminal that is configured to be connected to an ignition circuit of the internal combustion engine. The control unit includes an RPM input pin that is connected to the ignition input terminal such that the control unit can detect the operational status of the internal combustion engine.

In one embodiment of the present disclosure, the battery pack includes a shutdown switching element. The control unit can control the condition of the shutdown switching element to selectively connect an ignition circuit of the internal combustion engine to ground. Connecting the ignition circuit to ground either inhibits operation of the internal combustion engine or, when the internal combustion engine is operating, terminates operation of the internal combustion engine. In this manner, the control unit of the battery pack can selectively enable or terminate operation of the internal combustion engine through an internal shutdown switching element.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
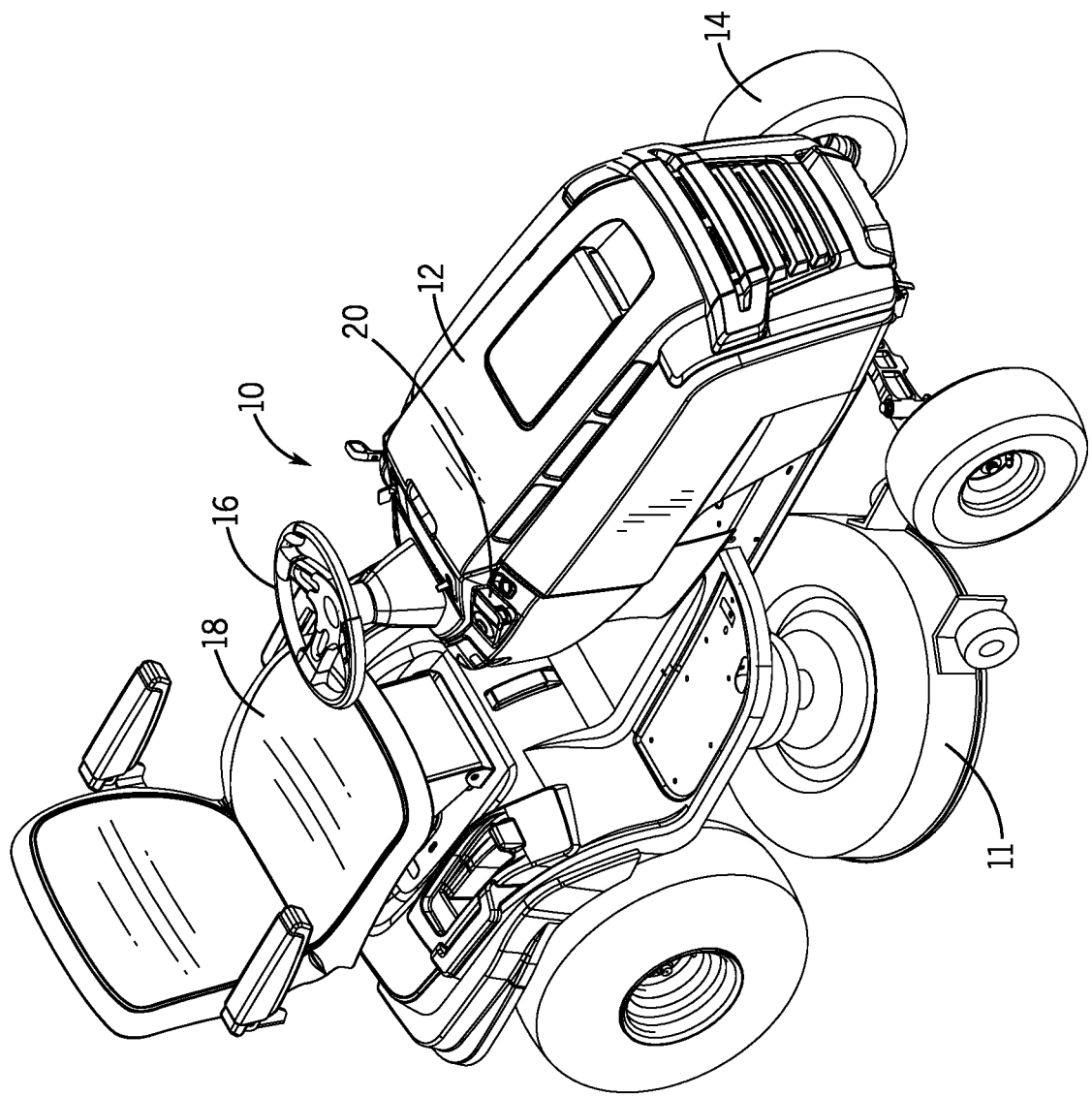
FIG. 1 is a front perspective view of a lawn tractor including the battery pack according to some embodiments.

The present disclosure is directed to a battery pack and starting system for an internal combustion engine of a lawn tractor. The drawing figures depict the use of the battery pack and starting system with a lawn tractor. However, it should be understood that the battery pack and starting system could be utilized with other types of outdoor power equipment such as with lawn mowers, riding tractors, snow throwers, pressure washers, tillers, log splitters, zero-turn radius mowers, walk-behind mowers, riding mowers, stand-on mowers, pavement surface preparation devices, industrial vehicles such as forklifts, utility vehicles, commercial turf equipment such as blowers, vacuums, debris loaders, over-seeders, power rakes, aerators, sod cutters, brush mowers, sprayers, spreaders, etc.

FIG. 1 illustrates a riding lawn tractor 10 that includes a mowing assembly 11 mounted beneath a vehicle chassis 12 supported by four wheels 14. The lawn tractor 10 includes an internal combustion engine (not shown) that powers both the rear drive wheels and the mower blade contained within the mowing assembly 11. A steering wheel 16 allows an operator positioned in the seat 18 to control the movement of the lawn tractor 10, as is conventional. In the embodiment shown in FIG. 1, the lawn tractor 10 includes an ignition switch 19 that is used by the operator to start operation of the internal combustion engine. The ignition switch 19 could be a three position key switch or could be a push-button. The operation of the ignition switch 19 will be detailed below. The details of the lawn tractor 10 shown in FIG. 1 are meant of illustrative purposes only, since the lawn tractor 10 could have various different operator controls and physical configurations while falling within the scope of the present disclosure.

Figure 2:
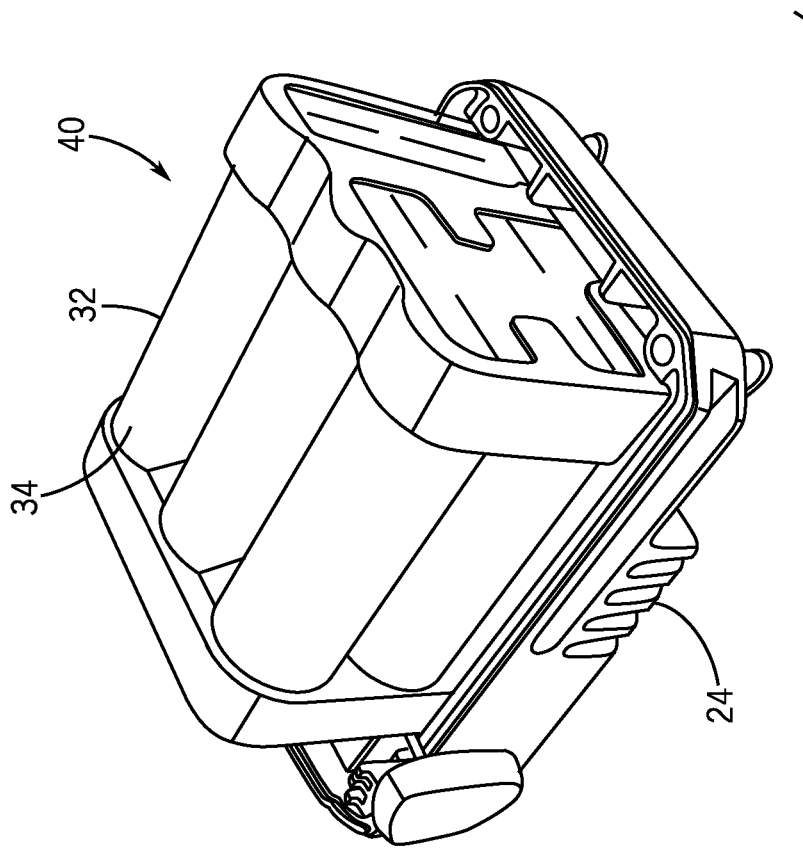
FIG. 2 is a series of perspective views of the battery pack according to some embodiments.
Figure 2:
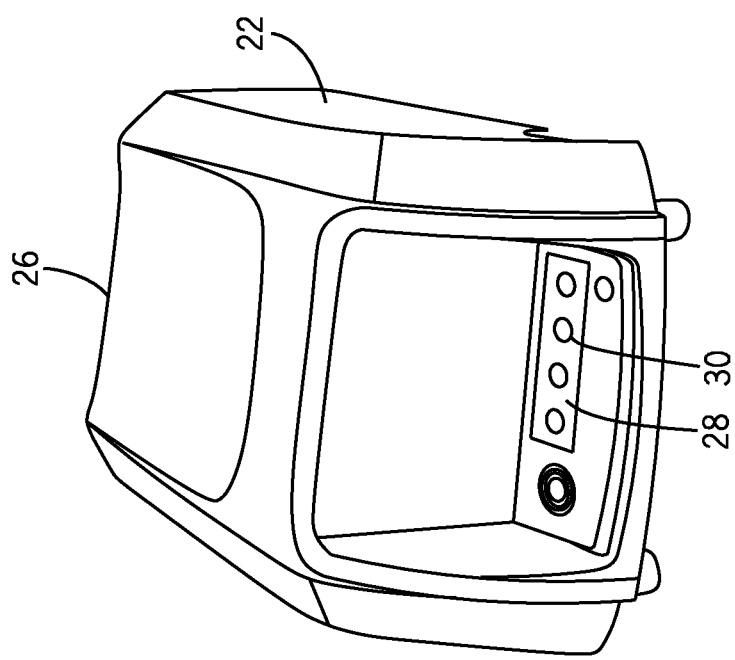

FIG. 2 illustrates one possible embodiment of a battery pack 40 constructed in accordance with the present disclosure. The battery pack 40 includes a two-piece outer battery housing 22 that includes a bottom portion 24 and a top portion 26. The top portion 26 includes a power level display 28 that includes a plurality of individual indicator lights 30. Although the embodiment shown in FIG. 2 includes multiple indicator lights 30, it is contemplated that the multiple indicator lights 30 could be replaced by a single LED that changes color depending upon the charge stored on the internal battery cell. As an example, the indicator lights 30 could be replaced by a single LED that changes color from green to yellow to red, depending upon the state of charge on the internal battery pack. Alternatively, the multiple indicator lights 30 could be replaced by a single LED that flashes, remains on in a steady state, or is turned off depending upon the charge level of the battery pack 40. Such embodiment would allow for a single color LED.

In the embodiment shown in FIG. 2, the battery pack 40 includes six individual battery cells 34 that are organized and connected to each other and are contained within the outer battery housing 22, as will be described in greater detail below. In the embodiment shown in FIG. 2, the six individual battery cells 34 are stacked in two rows each including three cells. However, it is contemplated that other configurations could be utilized while operating within the scope of the present disclosure. The size of the outer battery housing 22 is configured to accommodate the six battery cells 34, which provides for additional interior space for the charging circuit and switching circuit to be described below.

Figure 3:
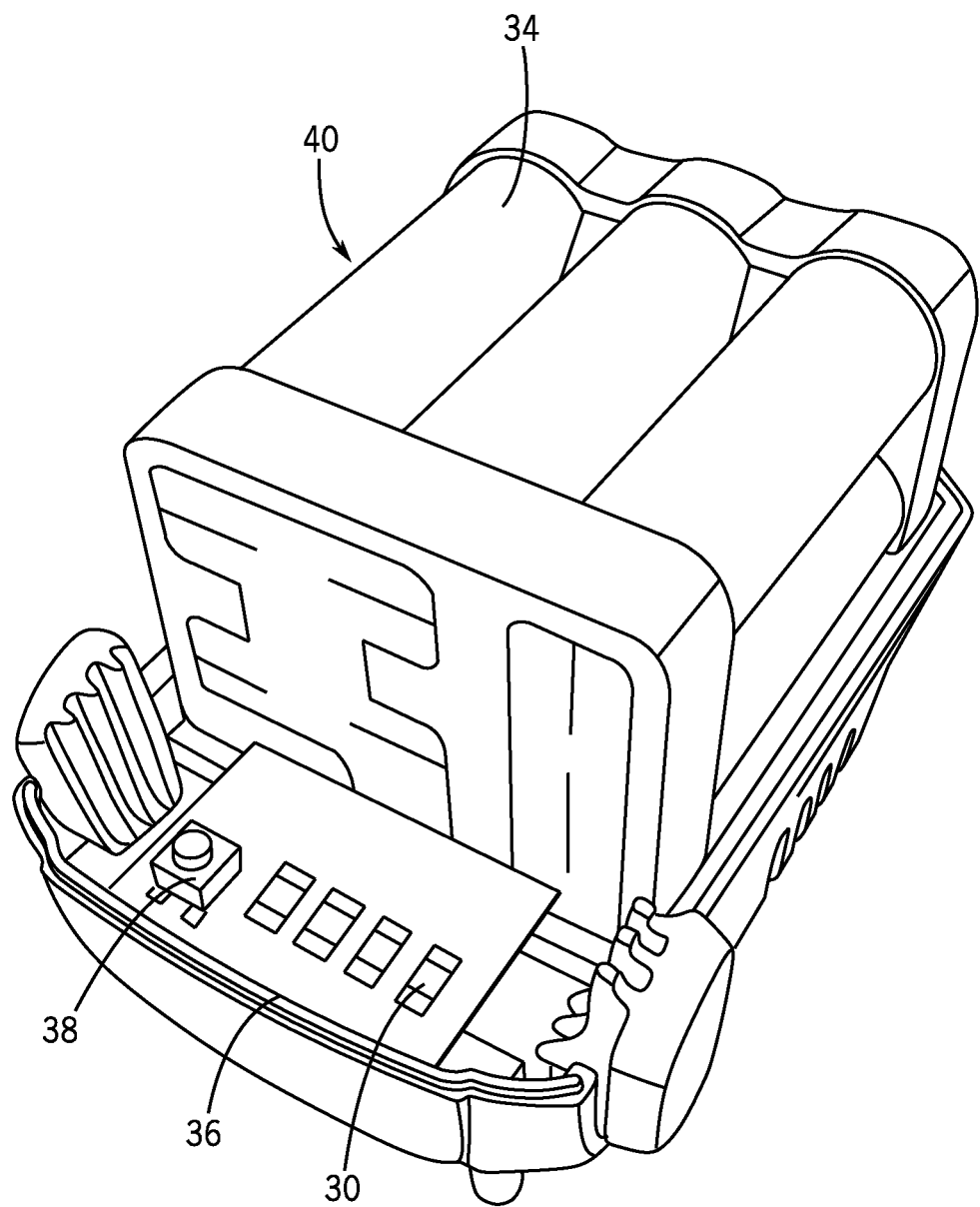
FIG. 3 is a front perspective view of the battery pack according to some embodiments.

FIG. 3 illustrates the circuit board 36 that includes the indicator lights 30. In addition, the circuit board 36 includes an activation switch 38 that allows the user to test the charge of the battery pack 32. For example, the indicator lights 30 may only provide an indication to the user of the charge of the battery pack 32 when the activation switch 38 is actuated by the user.

In the embodiment illustrated, each of the individual battery cells 34 of the battery pack 40 can be one of two different types of storage cells. In one embodiment, each of the cells 34 is a common lithium ion battery, referred to as an NMC (nickel magnesium cobalt) battery. The NMC battery cells may be configured to have a pre-defined voltage level. For example, each of the NMC battery cells in battery pack 34 may have a rating of 3.6 volts. In other embodiments, each of the battery cells 34 may be another type of lithium ion battery referred to as a lithium iron phosphate cell (LiFePO4, LFP). A lithium iron phosphate ("LFP") battery is a type of lithium ion rechargeable battery that is typically used for high power applications. An LFP battery allows for reduced protection circuitry as compared to an NMC battery, and typically offers a longer usable life, better power density and is inherently safer. An LFP battery has a typical maximum charge capacity of 3.2 volts each in the embodiment shown in FIG. 3. In the present disclosure, both the LFP and NMC battery cells will be referred to as lithium ion battery cells. In addition, other chemistries are contemplated as being useful for the battery cells 34.

In the embodiment illustrated, the six individual battery cells 34 of the battery pack 40 are believed to be able to provide enough current to start an internal combustion engine of the lawn tractor many times, which means that there will be a relative significant amount of time between charges.

Figure 4:
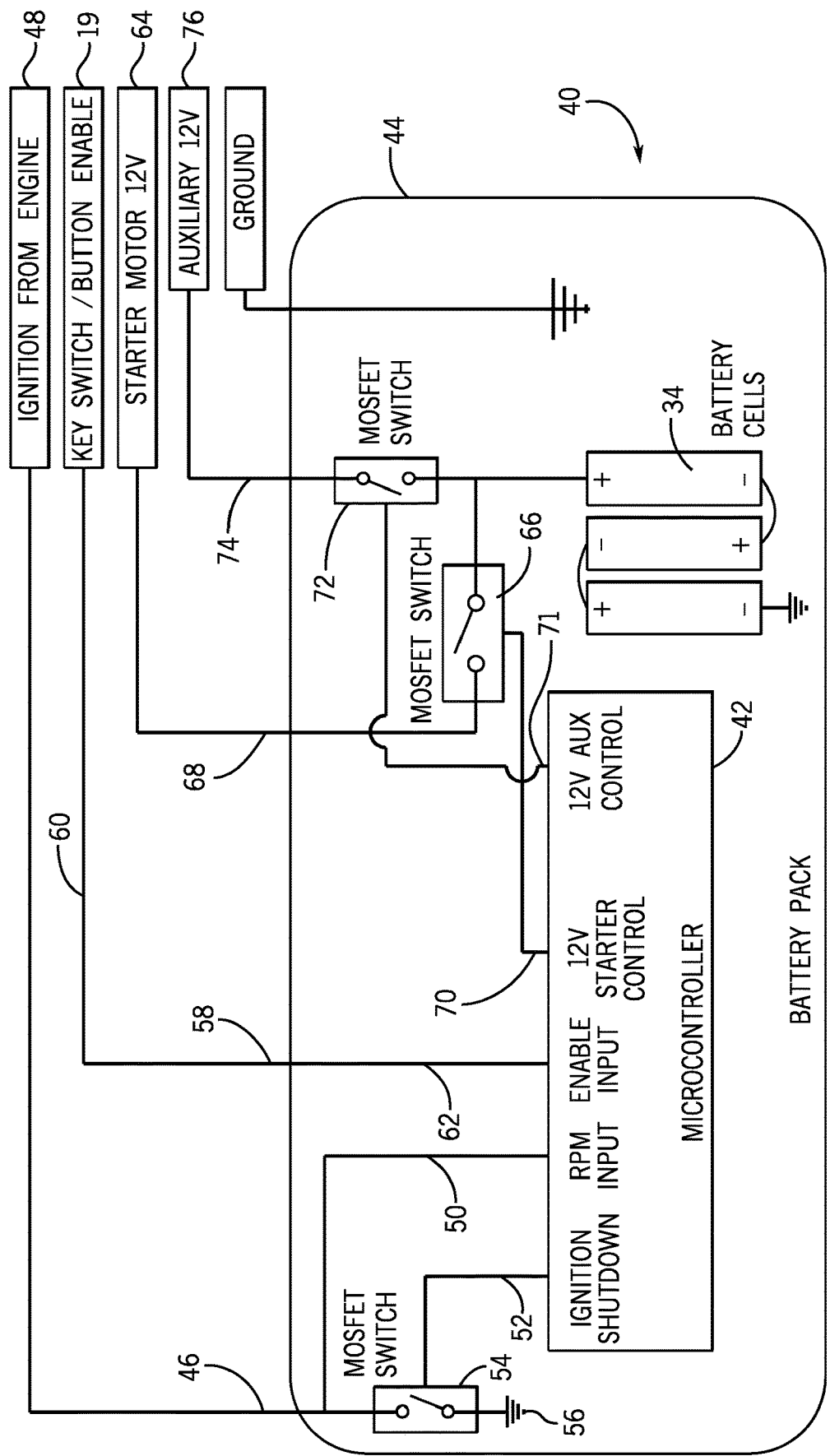
FIG. 4 is an electrical schematic illustration of the operating components of the starter battery pack according to some embodiments.

FIG. 4 illustrates the operating configuration of a battery pack 40 according to some embodiments. The battery pack 40 is shown in FIG. 4 as including a series of individual battery cells 34 connected in series. However, it should be understood that a different number of battery cells 34 could be utilized and that the battery cells could be connected in series, parallel or series-parallel configurations depending upon the output requirements from the combination of the battery cells 34. The battery pack 40 includes a control unit 42 within an outer housing 44 schematically shown in FIG. 4. The control unit 42 is positioned to receive inputs from other systems associated with the operation of the internal combustion engine and to control operation of multiple switches as will be described in greater detail below. In the embodiment shown in FIG. 4, the starter switching element 66 is shown positioned between the positive terminal of the group of battery cells 34 and the starter motor 64. In this manner, the starter switching element 66 can replace the starter solenoid.

As illustrated in FIG. 4, the battery pack 40 includes an ignition input terminal 46 that is connected to the ignition circuit 48, including an ignition coil, from the internal combustion engine. An ignition signal received at the ignition input terminal 46 is fed into the RPM input pin 50 of the control unit 42. The ignition signal from the ignition circuit 48 will include a series of pulses that correspond to the rotational speed of the internal combustion engine. By monitoring the pulses present at the RPM input pin 50, the control unit 42 will be able to determine whether the internal combustion engine is running or whether the internal combustion engine is not running.

In the embodiment shown in FIG. 4, the control unit 42 includes an ignition shutdown pin 52 connected to a shutdown switching element 54. The shutdown switching element 54 is connected between the ignition coil of the ignition circuit 48 of the internal combustion engine and ground 56. When the shutdown switching element 54 is in the closed condition, the ignition circuit 48 is connected directly to ground 56 which will ground the ignition coil. Grounding the ignition coil will either terminate operation of the internal combustion engine or will prevent starting of the internal combustion engine. When the shutdown switching element 54 transitions to the open condition shown in FIG. 4, the ignition circuit 48 would be ungrounded and thus allow for operation or starting of the internal combustion engine. In the embodiment shown in FIG. 4, the shutdown switching element 54 is a MOSFET switch that can transition between "open" and "closed" conditions through the application of a voltage to the MOSFET from the control unit 42 (e.g. via ignition shutdown pin 52). Although a MOSFET is described in one embodiment as the shutdown switching element 54, it should be understood that different types of switching elements, such as an SCR, transistor, IGBT or a relay, could be utilized while operating within the scope of the present disclosure.

The battery pack 40 includes an enable terminal 58 that is connected to an ignition switch 19. The ignition switch 19 can be one of multiple different types, such as a multi-position key switch, a push button starter or any other type of device or switch that can generate an enable signal along line 60. As an illustrative example, when the ignition switch 19 is a multi-position key switch, when the key switch is moved to a cranking position to start the engine, a ground signal is present along the line 60, which in turn is received at the enable input pin 62 of the control unit 42. Likewise, when the ignition switch 19 is a push button, depressing the push button creates a similar ground signal along line 60, which is also received at the enable input pin 62.

When the control unit 42 receives the enable signal at the enable input pin 62, the control unit 42 can then determine whether starting of the internal combustion engine should be allowed to occur. For example, if the control unit 42 determines that the internal combustion engine is running, a starting action is not necessary, and could damage the starter motor 64 or the internal combustion engine itself. If the control unit 42 determines that the internal combustion engine is not running, based upon the signal present at the RPM input pin 50, the control unit 42 can initiate operation of the starter motor 64. To do so, the control unit 42 controls the operational state of a starter switching element 66 which is positioned between the series of battery cells 34 and the starter motor 64. When the starter switching element 66 is in the closed condition, the voltage from the series of battery cells 34 is present at the 12 volt starter terminal 68 of the battery pack 40. The 12 volt starter terminal 68 is connected directly to the starter motor 64 to provide the required twelve volts needed to operate the starter motor. In the embodiment shown in FIG. 4, the starter switching element 66 is a MOSFET switching element, the condition of which can be controlled by the control unit through the voltage present at the starter control pin 70. Although a MOSFET is described in one embodiment as the starter switching element 66, it should be understood that different types of switching elements, such as an SCR, transistor, IGBT or a relay, could be utilized while operating within the scope of the present disclosure.

After the starter switching element 66 is moved to the "closed" condition, the battery voltage is supplied to the starter motor 64 through the starter terminal 68. The control unit 42 monitors the signals from the ignition circuit 48 through the RPM input pin 50 to determine whether the internal combustion engine starts. Once the control unit 42 determines that the internal combustion engine has started, the control unit 42 moves the starter switching element 66 back to the "open" condition to remove the voltage from the battery cells 34 from the starter motor 64. The control unit 42 can disable the starter motor voltage by keeping the starter switching element 66 "open" if the ignition switch signal 19 is released before the engine is detected as running. This decision is based on whether the control unit 42 is programmed to crank only while the ignition switch signal 19 is present or whether the control unit 42 goes into an auto crank mode where the starting process continues regardless of whether the ignition switch signal 19 remains present.

In addition to providing voltage from the series of battery cells 34 to the starter motor 64 to initiate operation of the starter motor, the control unit 42 can control the condition of an auxiliary switching element 72 which is connected between the series of battery cells 34 and an auxiliary terminal 74. The auxiliary terminal 74 provides power to a series of auxiliary devices and loads 76 of the lawn tractor though an auxiliary bus. These auxiliary loads can include lights, radio, a display, gauges or any other component on the vehicle that could be powered when the internal combustion engine of the tractor is not operating. As an illustrative example, if the operator of the lawn tractor wishes to operate the radio or lights of the tractor without turning the tractor on, the operator could move the key switch to an auxiliary position, which would be sensed by the control unit 42 at the enable input pin 62. Since the internal combustion engine is not running, the control unit 42 would make this determination based upon the signal present at the RPM input pin 50. Based upon these two inputs, the control unit 42 can generate a signal on the auxiliary pin 71 which will then transition the auxiliary switching element 72 to the "closed" condition and supply battery power to the auxiliary loads 76 for a limited period of time.

As can be understood by the above description, the inclusion of the ignition input terminal 46 on the battery pack 40 allows the control unit 42 to monitor the operation of the internal combustion engine. In such a manner, the control unit 42 is able to detect whether the internal combustion engine is running and allows the control unit 42 to disconnect the series of battery cells 34 from the auxiliary devices using the auxiliary switching element 72 after the user has stopped operation of the internal combustion engine. This feature would prevent the battery pack 40 from draining the battery cells 34 if the ignition switch 19 is left in the on position for an extended period of time after the engine has stopped operation. In some embodiments, the control unit 42 uses elapsed time from termination of the engine operation to disconnect the battery pack 40 from the auxiliary devices. In addition, the control unit 42 will be able to ground the ignition circuit 48 of the internal combustion engine if desired.

The inclusion of the ignition input terminal 46 on the battery pack 40 also allows the ignition switch 19 to provide additional functions when the ignition switch 19 is a momentary push button. Specifically, when the internal combustion engine is running, the user can again depress the momentary push button to stop operation of the internal combustion engine. When the control unit 42 is sensing operation of the engine through the RPM input pin 50 and then receives a signal at the enable input pin 62, the control unit 42 can stop the engine by grounding the ignition circuit 48 through the shutdown switching element 54. As stated above, when the shutdown switching element 54 is in its "closed" condition, the ignition circuit 48 of the internal combustion engine is grounded, which stops operation of the internal combustion engine. Examples of use of this feature could be utilized in a pressure washer in which the internal combustion engine includes a spray wand having a trigger switch. When the trigger switch is initially pulled, the trigger switch will function in the same manner as a push button starting switch. Upon detecting the trigger switch, the microcontroller would start the internal combustion engine. When the trigger switch is released, the control unit 42 would sense such change of state and terminate operation of the internal combustion engine through the shutdown switching element 54. In some embodiments, the control unit 42 may include a time delay circuit to prevent shutdown of the internal combustion engine immediately upon the user releasing the trigger switch. In one example, the time delay circuit may provide a ten second time delay. However, other time delay values of more than ten seconds or less than ten seconds are also contemplated. Other possible uses are also contemplated as being within the scope of the present disclosure.

Figure 5A:
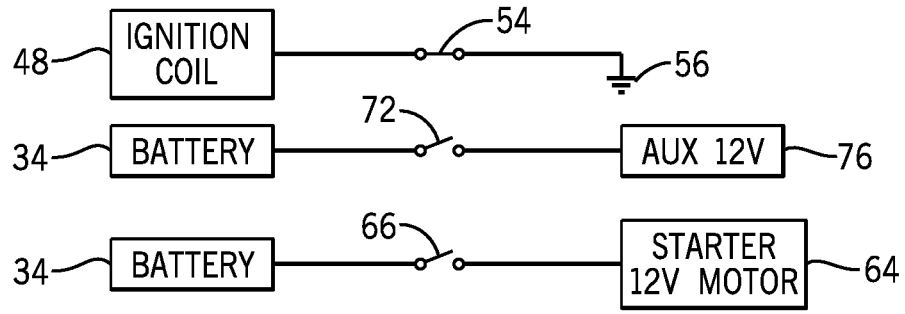
FIG. 5A is a schematic illustration of the operating condition of the switching elements when the internal combustion engine is off.
Figure 5B:
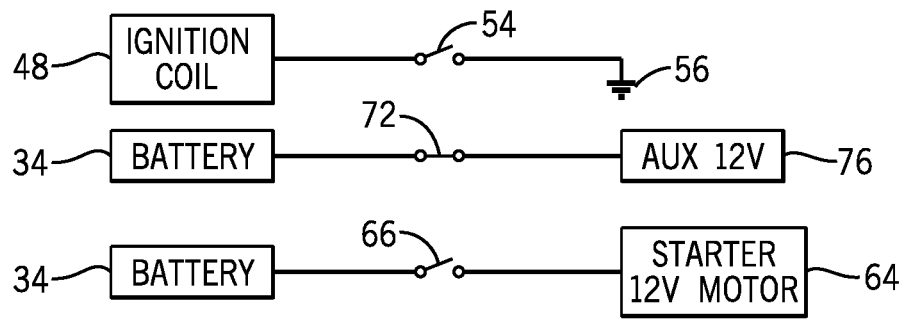
FIG. 5B is a schematic illustration of the operating condition of the switching elements when the internal combustion engine is running.
Figure 5C:
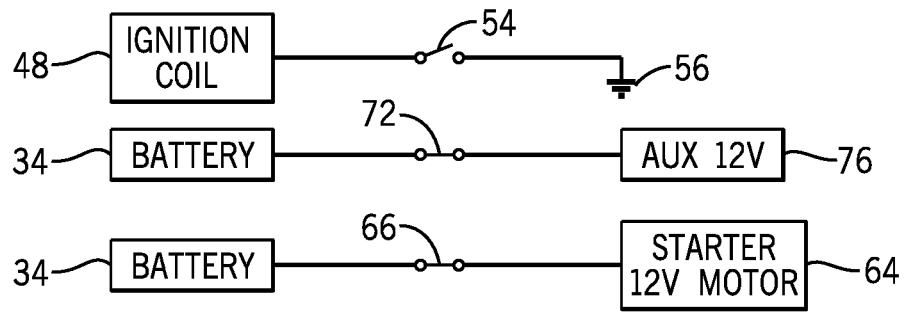
FIG. 5C is a schematic illustration of the operating condition of the switching elements during cranking of the starter motor.

FIGS. 5A-5C illustrate the three different operating conditions and the position of the various switching elements contained within the battery pack 40. In FIG. 5A, the internal combustion engine is in an off condition. In this state, the shutdown switching element 54 is in a "closed" condition such that the ignition circuit 48 is connected to ground 56. In the engine off condition, the battery cells are not connected to either the auxiliary loads 76 or the starter motor 64 by the starter switching element 66 and the auxiliary switching element 72 being in the "open" condition.

If the user desires to begin operation of the internal combustion engine, which is indicated by movement of the ignition switch, the control unit causes the shutdown switching element 54 to transition into the open condition. In this condition, the ignition circuit 48 is disconnected from the ground 56. At the same time, both the starter switching element 66 and the auxiliary switching element 72 transition to the closed condition such that the battery cells 34 are connected to both the auxiliary loads 76 and the starter motor 64, as shown in FIG. 5C.

Once the internal combustion engine begins running, which the control unit senses through the RPM input pin, the control unit causes the starter switching element 66 to transition into the open condition, thereby disconnecting the battery cells 34 from the starter motor 64, while maintaining the auxiliary switching element in a closed condition, as shown in FIG. 5B. As can be understood in FIGS. 5A-5C, the control unit contained within the battery pack 40 can start the internal combustion engine, control the battery power connections to the auxiliary loads and terminate operation of the internal combustion engine.

Figure 6:
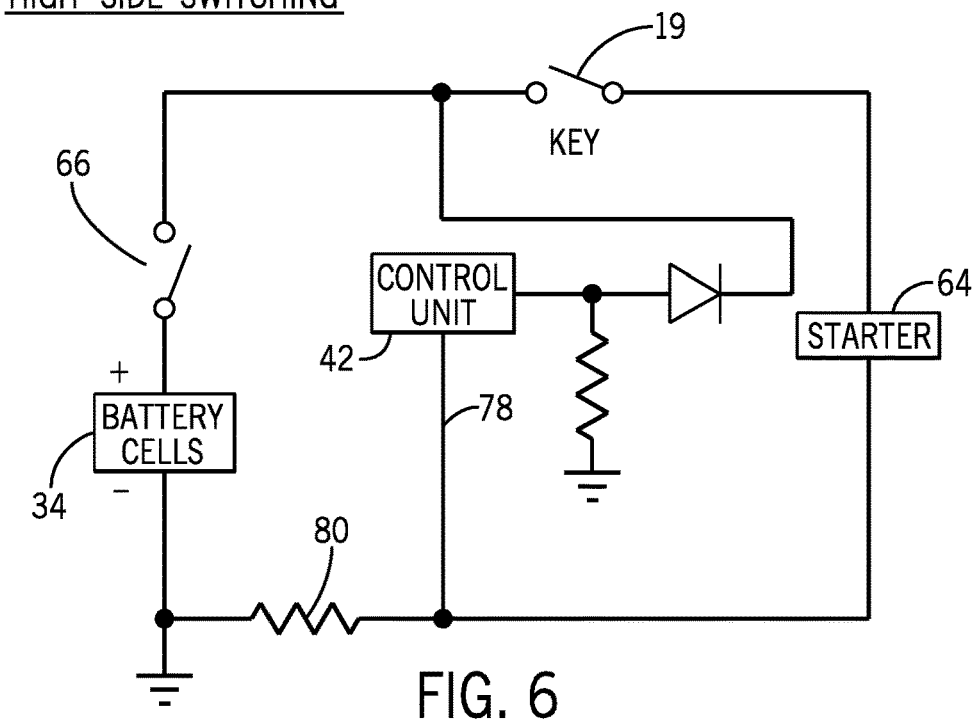
FIG. 6 is an electrical schematic illustration showing high-side switching according to some embodiments.

FIG. 6 provides a more detailed illustration of the operation of the starter switching element 66. As illustrated, the starter switching element 66 is positioned at the positive terminal of the group of battery cells 34. The ignition switch 19 is positioned between the starter switching element 66 and the starter motor 64. When the ignition switch 19 is closed, the control unit 42 can detect the battery ground through the starter 64 via the shown diode/resistor circuit 83. The control unit 42 can then close the starter switching element 66, sending current through the starter motor 64. Thus, both the starter switching element 66 and the ignition switch 19 are required to be in the closed condition for the voltage from the group of battery cells 34 to be provided to the starter motor 64. The control unit 42 includes a sensing pin 78 that can sense the flow of current through the starter motor 64 in the path to ground through the sensing resistor 80. Thus, when the starter switching element 66 and ignition switch 19 are in their "closed" condition, current flows through the starter motor 64, which is then sensed by the control unit 42 at the sensing pin 78. Once the control unit 42 senses operation of the internal combustion engine in the manner described previously, the control unit 42 causes the transition of the starter switching element 66 back to the open condition. When in the open condition, the starter motor 64 stops operating, which is confirmed by the control unit 42 by the lack of any voltage at the sensing pin 78.

Figure 7:
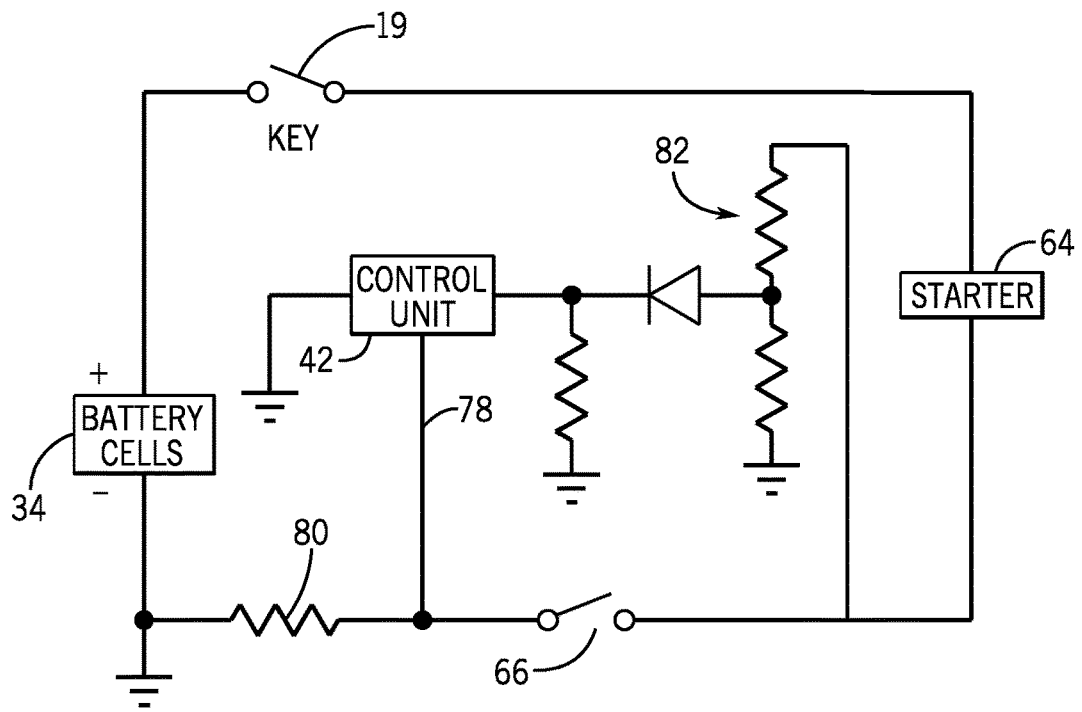
FIG. 7 is an electrical schematic illustration showing low-side switching according to some embodiments.

FIG. 7 is an alternate arrangement in which the starter switching element 66 is located between the negative terminal of the group of battery cells 34 and ground. Once again, when the ignition switch 19 is closed, the control unit 42 can detect the battery cell voltage through the starter 64 and the resistor bridge 82. The control unit 42 then can cause the starter switching element 66 to transition into the closed condition as long as the engine is not running, thus protecting the starter motor pinion gear. The starter switching element 66 provides a path to ground for the starter 64, at which time current will flow from the battery cells 34 through the starter motor 64. This current is sensed through resistor 80 and through the current sensing pin 78. Once again, the control unit 42 can transition the starter switching element 66 between open and closed conditions based upon a desire to operate the starter motor 64 and upon sensing operation of the internal combustion engine.

Figure 8:
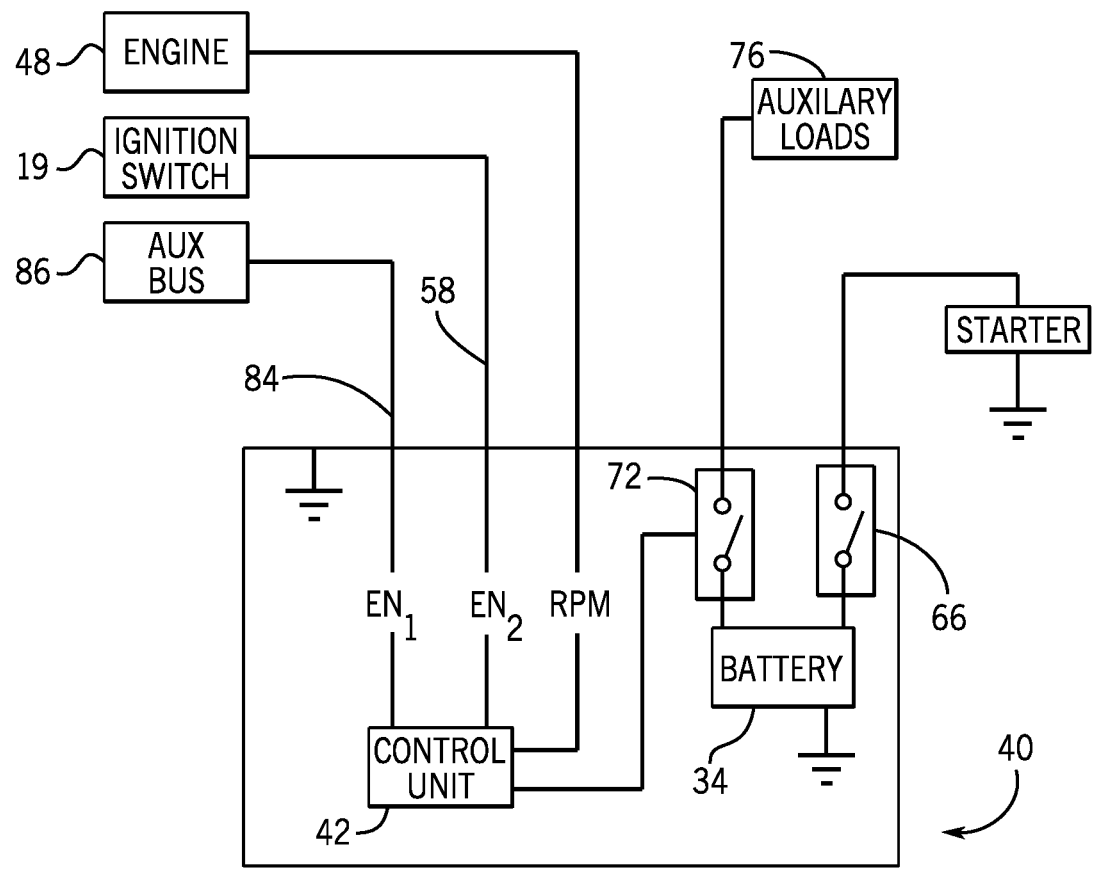
FIG. 8 is an electrical schematic illustration of an alternate embodiment of the battery pack including two enable inputs according to some embodiments.

Referring now to FIG. 8, thereshown is an alternate arrangement for the battery pack 40. In this arrangement, the control unit 42 includes two enable inputs rather than the single enable input shown in FIG. 4. As with the embodiment shown in FIG. 4, the battery pack 40 includes an enable terminal 58 that is connected to the ignition switch 19. A second enable terminal 84 is connected to the auxiliary bus 86, which includes the connection between the battery cells 34 and the auxiliary loads 76. Thus, the signal on the enable terminal 84 is directly dependent upon whether the battery cells 34 are connected to the auxiliary loads 76 through the auxiliary switching element 72. The use of the second enable terminal 84 allows the control unit 42 to detect when the ignition switch 19 is in the run position and the internal combustion engine is not operating. Such situation may occur when the user wishes to operate the auxiliary loads 76 without turning on the internal combustion engine. If in the run position for too long without the engine running, the control unit 42 can transition the auxiliary switching element 72 back to the open condition to disconnect the battery cells 34 from the auxiliary load 76.

Figure 9:
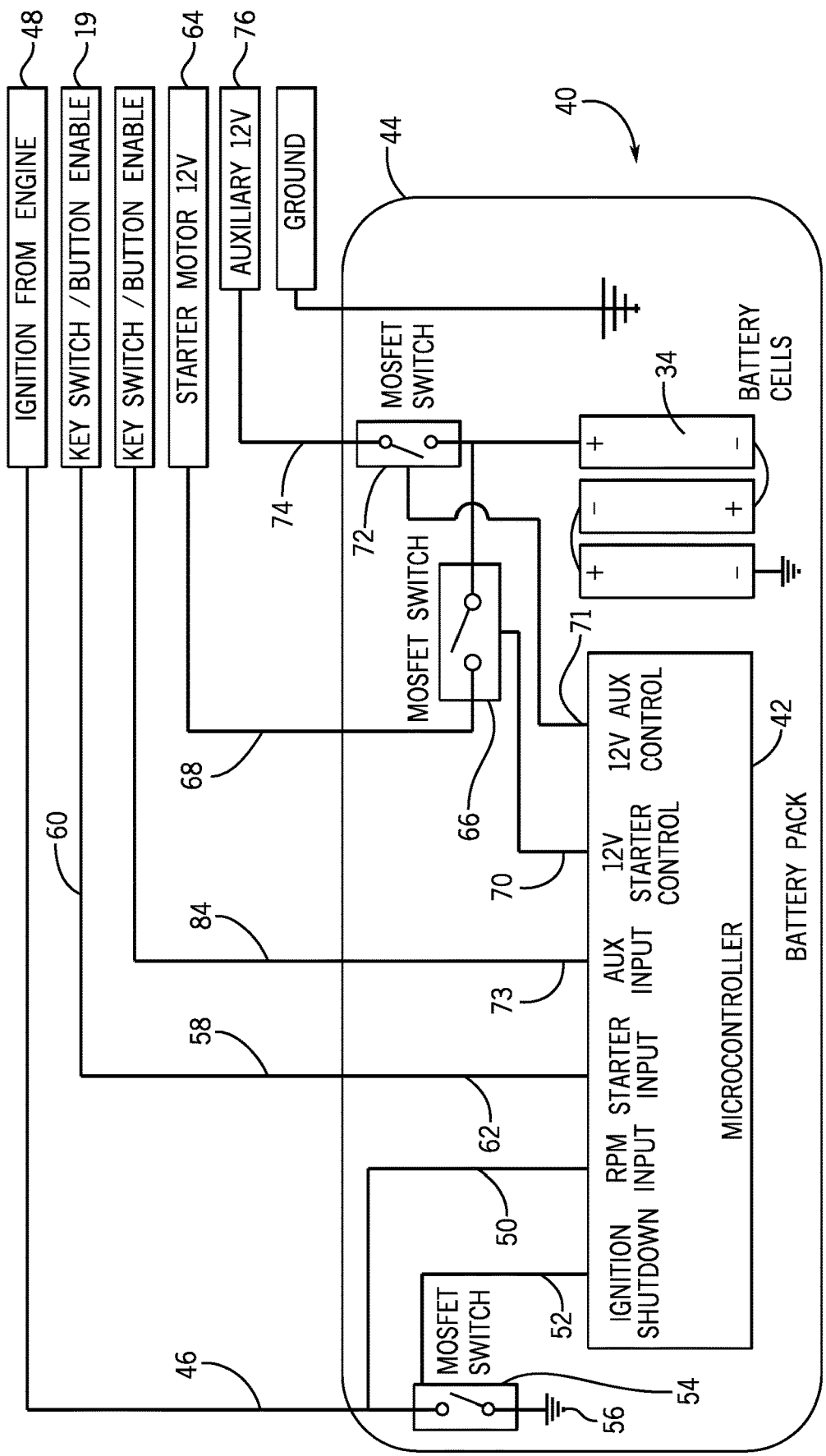
FIG. 9 is an electrical schematic illustration of the operating components of the starter battery pack including two enables according to some embodiments

FIG. 9 shows another embodiment for the battery pack 40. In this embodiment, the battery pack 40 includes two enable inputs, 58 and 84, that come from a key switch or push button. On typical key starting circuits, the starter signal from the control unit would pass through a brake switch and a blade switch. The starter motor, in such embodiment, would not engage unless the brake is on and the blades are turned off. The second enable shown in FIG. 9 can be used to see if the safety requirements are met before engaging the starter motor 64. For example, the 12 V power supply feeding the auxiliary loads 76 could be directed through the blade and brake switches to determine if the switches are closed. If a signal is received at the auxiliary input pin 73, the control unit 42 will know that it is safe to operate the starter motor 64. In an embodiment with a momentary push button for starting, the first press of the button will wake up the battery and turn on the auxiliary power for the auxiliary loads 76. A second press of the button will be sensed by the control unit 42 and if the required signal is present at pin 73, the starter motor 64 will be activated. Additionally, if the push button is depressed and held in the depressed positon, the control unit 42 can turn on the auxiliary power and initiate cranking of the engine which the push button is depressed.

Figure 10:
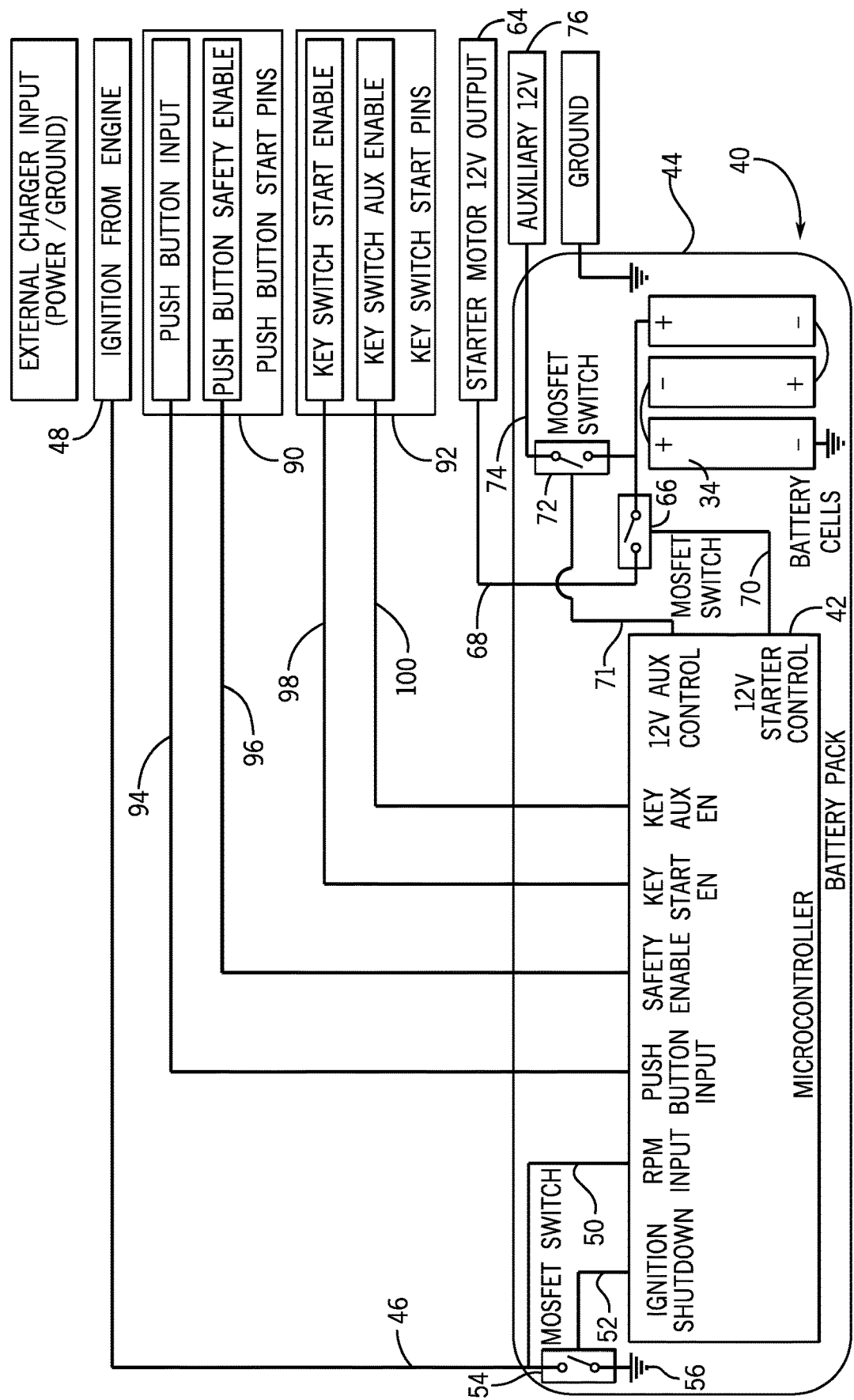
FIG. 10 is an electrical schematic illustration of the operating components of the starter battery pack including two enables according to some embodiments.

FIG. 10 provides yet another embodiment in which the push button 90 and the key switch 92 each generate two separate inputs for the control unit 42. The push button 90 includes both an input line 94 and a safety enable 96 that are received at separate input pins to the control unit 42. The key switch 92 has a similar input line 98 and auxiliary enable line 100 received at pins on the control unit 42. The control unit 42 operates in a similar manner as discuss with reference to FIG. 9 to determine whether to active the starter motor 64.

Figure 11A:
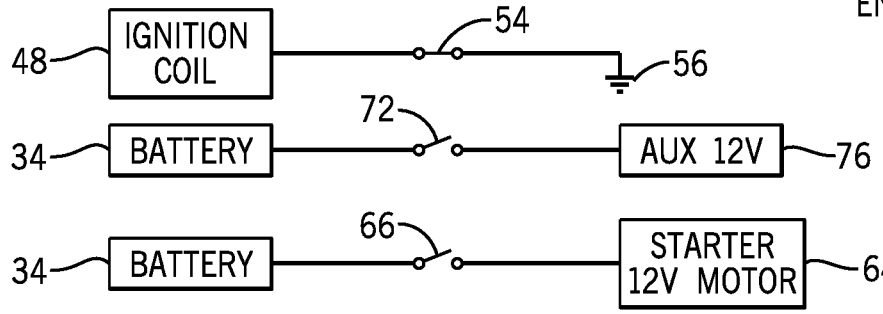
FIG. 11A is a schematic illustration of the operating condition of the switching elements in a two enable system when the internal combustion engine is off according to some embodiments.
Figure 11B:
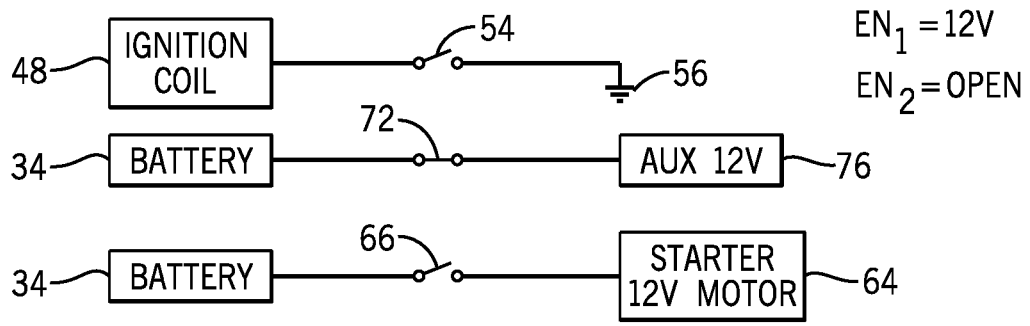
FIG. 11B is a schematic illustration of the operating condition of the switching elements in a two enable system when the internal combustion engine is running according to some embodiments.
Figure 11C:
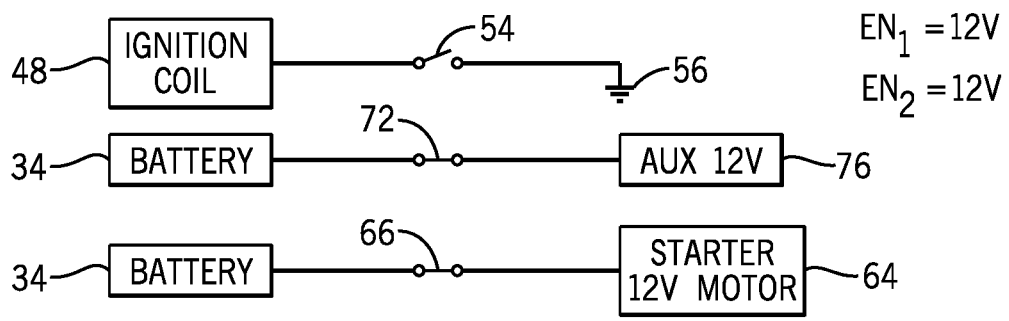
FIG. 11C is a schematic illustration of the operating condition of the switching elements in a two enable system during cranking of the starter motor according to some embodiments.

FIGS. 11A-11C illustrate the three different operating conditions and the position of the various switching elements contained within the battery pack 40 shown in FIGS. 9 and 10 with two enables. In FIG. 11A, the internal combustion engine is in an off condition. In this state, the shutdown switching element 54 is in a "closed" condition such that the ignition circuit 48 is connected to ground 56. In the engine off condition, the battery cells are not connected to either the auxiliary loads 76 or the starter motor 64 by the starter switching element 66 and the auxiliary switching element 72 being in the "open" condition. In this condition, both of the enable inputs are "open".

If the user desires to begin operation of the internal combustion engine, which is indicated by movement of the ignition switch, the control unit causes the shutdown switching element 54 to transition into the open condition. In this condition, the ignition circuit 48 is disconnected from the ground 56. At the same time, both the starter switching element 66 and the auxiliary switching element 72 transition to the closed condition such that the battery cells 34 are connected to both the auxiliary loads 76 and the starter motor 64, as shown in FIG. 11C. At this time, the first enable signal goes to the high, 12 V level.

Once the internal combustion engine begins running, which the control unit senses through the RPM input pin, the control unit causes the starter switching element 66 to transition into the open condition, thereby disconnecting the battery cells 34 from the starter motor 64, while maintaining the auxiliary switching element in a closed condition, as shown in FIG. 11B. At this time, the first enable signal is high while the second enable signal is an open circuit since the engine is running. As can be understood in FIGS. 11A-11C, the control unit contained within the battery pack 40 can start the internal combustion engine, control the battery power connections to the auxiliary loads and terminate operation of the internal combustion engine.

In an embodiment that includes a key switch to start the internal combustion engine, there will be two distinct enables. A first enable will be for the auxiliary power on and the second will be for turning on the starter motor. In a system including a push button in place of the key switch, there could be one or two enables. With two enables, one of the enables would direct the push button signal to the control unit and the other would send the state of the safeties (blades on/off and brake on/off).

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A battery pack for use in powering a starter motor to start an internal combustion engine and supplying power to one or more auxiliary loads, the battery pack comprising:
   an outer housing;
   a plurality of battery cells enclosed in the outer housing;
   a starter switching element positioned within the outer housing and located between the plurality of battery cells and the starter motor;
   an auxiliary switching element positioned within the outer housing and located between the plurality of battery cells and the auxiliary loads; and
   a control unit positioned within the outer housing and configured to control a condition of the starter switching element and the auxiliary switching element to selectively couple the plurality of battery cells to the starter motor and the auxiliary loads.

2. The battery pack of claim 1 further comprising an ignition input terminal configured to be connected to an ignition circuit of the internal combustion engine, wherein the control unit includes an RPM input pin connected to the ignition input terminal.

3. The battery pack of claim 2 wherein the control unit determines an operational status of the internal combustion engine based upon a signal on the RPM input pin.

4. The battery pack of claim 1 further comprising a shutdown switching element positioned between the ignition input terminal and a ground, wherein the control unit is configured to control a condition of the shutdown switching element.

5. The battery pack of claim 4 wherein the shutdown switching element is transitioned to a first state to connect the ignition input terminal to ground to either terminate operation of the internal combustion engine or to prevent cranking of the internal combustion engine.

6. The battery pack of claim 1 further comprising an enable terminal that is configured to be connected to an ignition switch of the internal combustion engine.

7. The battery pack of claim 6 wherein the ignition switch is a push button.

8. The battery pack of claim 6 wherein the ignition switch is a multi-position key switch.

9. The battery pack of claim 6 further comprising a second enable input pin that is connected to an axillary bus connected to an axillary terminal of the battery pack.

10. A battery pack for use in powering a starter motor to start an internal combustion engine and supplying power to one or more auxiliary loads, the battery pack comprising:
    an outer housing;
    a plurality of battery cells enclosed in the outer housing;
    a starter terminal;
    a starter switching element positioned within the outer housing and located between the plurality of battery cells and the starter terminal;
    an auxiliary terminal;
    an auxiliary switching element positioned within the outer housing and located between the plurality of battery cells and the auxiliary terminal;
    at least one enable terminal;
    an ignition input terminal;

a shutdown switching element positioned between the ignition input terminal and a ground; and a control unit positioned within the outer housing and configured to control a condition of the starter switching element, the auxiliary switching element and the shutdown switching element to selectively couple the plurality of battery cells to the starter motor and the auxiliary loads and to enable operation of the internal combustion engine.

11. The battery pack of claim 10 further comprising a second enable terminal.

* * * * *